(12) United States Patent
Rapaport et al.

(10) Patent No.: US 8,542,313 B2
(45) Date of Patent: Sep. 24, 2013

(54) DEPTH FROM DEFOCUS CALIBRATION

(75) Inventors: Guy Rapaport, Haifa (IL); Meir Tzur, Haifa (IL); Artemy Baxansky, Nesher (IL)

(73) Assignee: CSR Technology Inc., Sunnyvale, CA (US)

(*) Notice: Subject to any disclaimer, the term of this patent is extended or adjusted under 35 U.S.C. 154(b) by 426 days.

(21) Appl. No.: 12/857,343

(22) Filed: Aug. 16, 2010

(65) Prior Publication Data

US 2011/0181770 A1 Jul. 28, 2011

Related U.S. Application Data

(60) Provisional application No. 61/298,607, filed on Jan. 27, 2010, provisional application No. 61/313,965, filed on Mar. 15, 2010.

(51) Int. Cl.
*H04N 5/232* (2006.01)
*H04N 5/228* (2006.01)
*H04N 5/225* (2006.01)

(52) U.S. Cl.
USPC .................. 348/345; 348/208.12; 348/220.1

(58) Field of Classification Search
USPC .... 348/220.1, 345, 349, 356; 356/4.03–4.07, 356/624; 250/201.2, 201.4; 382/255, 274, 382/168–172, 283, 298
See application file for complete search history.

(56) References Cited

U.S. PATENT DOCUMENTS

| | | | |
|---|---|---|---|
| 4,804,831 A | 2/1989 | Baba et al. | |
| 4,933,700 A | 6/1990 | Ikeda et al. | |
| 5,005,956 A | 4/1991 | Kaneda et al. | |
| 5,070,353 A | 12/1991 | Komiya et al. | |
| 5,144,357 A | 9/1992 | Ishida et al. | |
| 5,148,209 A | 9/1992 | Subbarao | |
| 5,151,609 A | 9/1992 | Nakagawa et al. | |
| 5,193,124 A | 3/1993 | Subbarao | |
| 5,231,443 A | 7/1993 | Subbarao | |

(Continued)

FOREIGN PATENT DOCUMENTS

| | | |
|---|---|---|
| JP | 62284314 A | 12/1987 |
| JP | 63127217 A | 5/1988 |

OTHER PUBLICATIONS

A.P. Pentland, "A new sense for depth of field", IEEE Transactions on Pattern Analysis and Machine Intelligence, vol. PAMI-9, No. 4, pp. 523-531 (Jul. 1987).

(Continued)

*Primary Examiner* — Lin Ye
*Assistant Examiner* — Euel Cowan
(74) *Attorney, Agent, or Firm* — Frommer Lawrence & Haug LLP; John W. Branch (57) ABSTRACT

A device and methods are provided for calculating depth estimation for a digital imaging device are disclosed and claimed. In one embodiment, a method includes detecting a first image associated with a first focus parameter, detecting a second image associated with a second focus parameter, calculating a statistical representation of a region of interest in the first and second images, and determining a ratio for the region of interest based on the statistical representation. The method may further include determining one or more focus characteristics using a memory table based on the determined ratio for the region of interest, and calculating a focus depth for capture of image data based on the determined one or more focus characteristics associated with the memory table.

24 Claims, 7 Drawing Sheets

(56) References Cited

U.S. PATENT DOCUMENTS

| | | | |
|---|---|---|---|
| 5,369,461 A * | 11/1994 | Hirasawa et al. | 396/135 |
| 5,475,429 A | 12/1995 | Kodama | |
| 5,793,900 A | 8/1998 | Nourbakhsh et al. | |
| 6,269,197 B1 * | 7/2001 | Wallack | 382/285 |
| 7,389,042 B2 | 6/2008 | Lin et al. | |
| 8,218,061 B2 | 7/2012 | Baxansky | |
| 2003/0063815 A1 * | 4/2003 | Watanabe | 382/255 |
| 2005/0218231 A1 | 10/2005 | Massieu | |
| 2006/0181644 A1 | 8/2006 | De Haan | |
| 2008/0075444 A1 | 3/2008 | Subbarao et al. | |
| 2008/0095312 A1 | 4/2008 | Rodenburg et al. | |
| 2008/0211959 A1 | 9/2008 | Balram et al. | |
| 2008/0297648 A1 | 12/2008 | Furuki et al. | |
| 2010/0053417 A1 | 3/2010 | Baxansky | |

OTHER PUBLICATIONS

M. Gokstorp, "Computing depth from out-of-focus blur using a local frequency representation", Proceedings of International Conference on Pattern Recognition, Oct. 1994.

M. Watanabe et al., "Real-time computation of depth from defocus", Proceedings of SPIE: Three-Dimensional and Unconventional Imaging for Industrial Inspection and Metrology, 2599:A-03, Nov. 1995.

M. Watanabe et al., "Rational filters for passive depth from defocus", International Journal of Computer Vision, vol. 27, Issue 3 (May 1998).

M. Subbarao et al., "Depth from defocus and rapid autofocusing: a practical approach", In Proc. CVPR, pp. 773-776, 1992.

M. Subbarao et al., "Depth from defocus: a spatial domain approach", International Journal of Computer Vision, vol. 13, No. 3, pp. 271-294, Dec. 1994.

Y. Xiong et al., "Depth from Focusing and Defocusing", Proceedings of the 1993 IEEE Computer Society Conference on Computer Vision and Pattern Recognition (CVPR '93), Jun. 1993, pp. 68-73.

M. Subbarao, "Parallel Depth Recovery by Changing Camera Parameters", Second International Conference on Computer Vision, Dec. 1998, pp. 149-155.

S.K. Navar et al., "Real-time focus range sensor", IEEE Transactions on Pattern Analysis and Machine Intelligence, vol. 18, No. 12, Dec. 1996.

V.M. Bove, Jr., "Entropy-Based Depth from Focus," Journal of the Optical Society of America A, 10, Apr. 1993, pp. 561-566.

D. Ziou et al., "Depth from defocus estimation in spatial domain", Computer Vision and Image Understanding, vol. 81, No. 2, pp. 143-165, Feb. 2001.

N. Asada et al., "Depth from blur by zooming," Proc. Vision Interface, pp. 165-172, 2001.

Sewlochan, Ray, "Iterative Depth From Defocus (I-DFD) Algorithms" The University of British Columbia, Apr. 1995, <https://circle.ubc.ca/bitstream/2429/3716/1/ubc_1995-0270.pdf>, Accessed Oct. 28, 2009.

International Search Report and Written Opinion for International Patent Application No. PCT/US2009/056002 mailed Nov. 17, 2009.

International Search Report and Written Opinion for International Patent Application No. PCT/US2010/045927 mailed Oct. 8, 2010.

International Preliminary Report on Patentability for International Patent Application No. PCT/US2010/045927 mailed Aug. 9, 2012.

Official Communication for U.S. Appl. No. 12/409,416 mailed Jan. 11, 2012.

Official Communication for U.S. Appl. No. 12/409,416 mailed May 2, 2012.

Official Communication for U.S. Appl. No. 13/183,363 mailed Jan. 8, 2013.

Official Communication for U.S. Appl. No. 13/183,363 mailed Apr. 25, 2013.

* cited by examiner

DEPTH FROM DEFOCUS CALIBRATION

CROSS-REFERENCE TO RELATED APPLICATION

This application claims the benefit of U.S. Provisional Application No. 61/298,607, filed Jan. 27, 2010 and 61/313,965 filed Mar. 15, 2010.

FIELD OF THE INVENTION

The present invention relates in general to methods for focusing an imaging device and in particular to calibration of an imaging device for estimating focus depth for a scene based on depth from defocus.

BACKGROUND

Many imaging devices employ automatic focus (AF) to allow for automatic adjustment of an imaging device to capture image data. For example, one conventional type of AF is based on depth from focus (DFF). Conventional methods of DFF typically capture image data for each focal position of a scene. The sharpness of each focal position may be then analyzed to determine the sharpest focal position, that is the focal position with the highest sharpness metric. As a result of the sharpness determination, the imaging device may automatically set the focus. This approach, however, requires capturing a plurality of images and results in a period of delay during automatic focus. In many instances, the processing delays of DFF do not suit many users of imaging devices, particularly portable imaging device such as digital cameras.

Another approach to automatic focus involves depth from defocus (DFD). Conventional methods and devices employing DFD are typically limited to stationary imaging devices. Further, these methods generally require modeling of blur information in order to determine automatic focus. As a result, parameters of the imaging device must be determined for each zoom and aperture state to allow for AF. These determinations are complicated and result in processing delays which do not suit many users of imaging devices. Accordingly, there is a need in the art for improved automatic focus which overcomes one or more of the aforementioned drawbacks.

BRIEF SUMMARY OF THE INVENTION

Disclosed and claimed herein are a device and methods for calculating depth estimation for a digital imaging device. In one embodiment, a method includes detecting a first image, by the digital imaging device, associated with a first focus parameter, detecting a second image, by the digital imaging device, associated with a second focus parameter, calculating a statistical representation of a region of interest in the first and second images, and determining a ratio for the region of interest based on the statistical representation. The method may further include determining one or more focus characteristics using a memory table based on the determined ratio for the region of interest, and calculating a focus depth, by the digital imaging device, for capture of image data based on the determined one or more focus characteristics associated with the memory table.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF EXEMPLARY EMBODIMENTS

Overview and Terminology

One aspect of the present invention relates to determining focus parameters for capturing image data. In one embodiment, a process is provided for estimating focus depth based on depth from de-focus (DFD). DFD employing statistical analysis and look-up-tables (LUT) as described herein provides advantages over conventional methods of focusing imaging devices, including faster and improved automatic focusing. In one embodiment, a process may include statistical calibration to provide a direct correlation between the amount of object blur and correct object position or object distance. This technique allows for faster automatic focus using DFD. Another advantage of the processes described herein, may be that determination of some complex, and possibly inaccurate, camera parameters to model each zoom and aperture state may be avoided. Further, the direct use of a look-up-table (LUT) may be employed in the spatial domain to greatly simplify the implementation of depth estimation procedure. Determination of depth estimation may further include a calibration procedure for estimating a LUT for all possible and/or required pairs of focus positions for a scene. In addition, a confidence LUT may be calculated to provide a confidence level for the estimated depth, such as a confidence table based on confidence levels and an estimated depth probability distribution for the confidence levels.

In another embodiment, an imaging device is provided to include automatic focusing via depth estimation for a scene according to one or more of the processes described herein. The imaging device, such as a digital camera, may be configured to determine one or more focus parameters during automatic focus.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means any of the following: A; B; C; A and B; A and C; B and C; A, B and C. An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that can be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits When implemented in software, the elements of the invention are essentially the code segments to perform the necessary tasks. The code segments can be stored in a "processor storage medium," which includes any medium that can store information. Examples of the processor storage medium include an electronic circuit, a semiconductor memory device, a ROM, a flash memory or other non-volatile memory, a floppy diskette, a CD-ROM, an optical disk, a hard disk, etc.

Exemplary Embodiments

Figure 1:
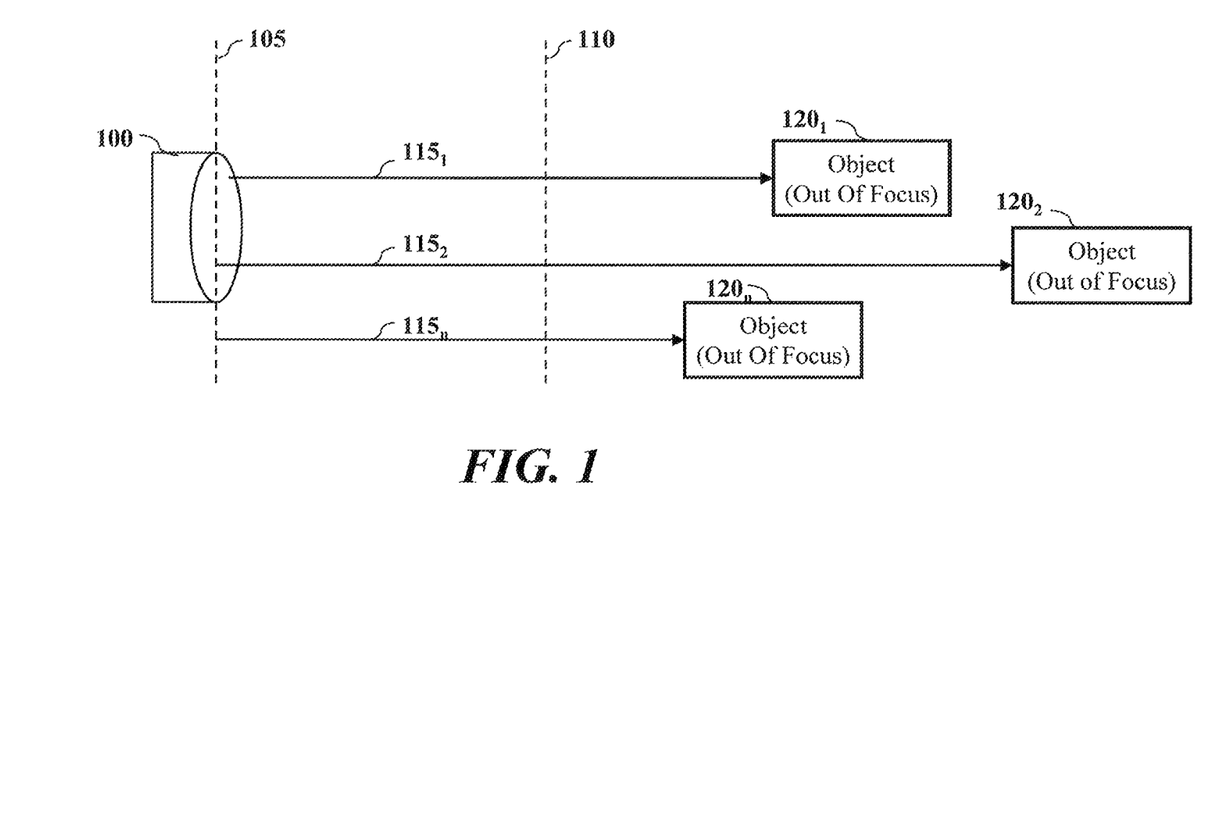
FIG. 1 depicts a graphical representation of depth from defocus (DFD) according to one embodiment of the invention.

Referring now to the figures, FIG. 1 depicts a graphical representation of depth from defocus (DFD) according to one embodiment of the invention. In one embodiment, DFD may be employed to estimate the depth of one or more objects of a scene by an imaging device. A scene, for example, may relate to the detection area of an imaging device. DFD may allow for the amount of blur of an object to be directly correlated to depth (e.g., distance from the camera). As depicted in FIG. 1, imaging device 100 and lens surface 105 may be focused on a depth, shown as 110. DFD may be employed to estimate the depth of objects in the field of view of imaging device 100 based on object depth and focus blur. For example, as will be described herein DFD may be employed to estimate depths, shown as $115_{1-n}$ of objects $120_{1-n}$.

Blur can be modeled as a convolution between an unblurred object and a point spread function. As discussed in U.S. patent application Ser. No. 12/409,416, which is hereby fully incorporated by reference, iterative automatic focusing may be provided for digital imaging devices.

Blur ratio may be directly connected to object distance. By way of example, blur width of a point source can be expressed as:

$$w = k \frac{d \cdot v}{2} \left( \frac{1}{f} - \frac{1}{v} - \frac{1}{u} \right)$$

where f is the focal length, u is the object distance from the lens, v is the distance between the lens and image detector, d is the aperture diameter and k is a camera constant that depends on camera optics.

According to one embodiment of the invention, DFD may be provided which includes statistical methods for estimating the connection between object depth and blur ratio. In certain embodiments, DFD may be provided without explicit consideration of camera model parameters or blur formation parameters. As a result, since a single blurred image does not allow for a point of reference with respect to blur and blur estimation from a single image is complicated and typically inaccurate, two blur images may be detected with different focus parameters in order to estimate a generalized blur ratio of the object in the two images.

In accordance with the blur width formulation as described above, for two images (of the same object(s)) with different distances, v1 and v2) the ratio w1/w2 is a function of u, based on the assumption that k, d, and f are constant. However, in practical imaging systems, blur characteristics may vary from the formulation and input may not be a point source. Therefore, a statistical approach is provided for implementation of a DFD concept.

Figure 2:
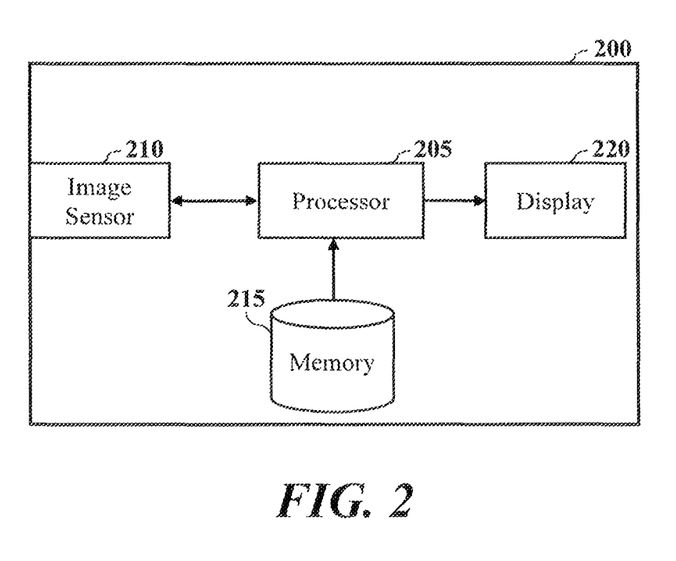
FIG. 2 depicts a simplified block diagram of an imaging device according to one embodiment of the invention.

FIG. 2 depicts a simplified block diagram of an imaging device, and more particularly a digital camera, according to one or more embodiments of the invention. Digital camera 200 includes image sensor 210. Sensor 210 may relate to a combination of an optical lens and light detection circuitry (e.g., CMOS integrated circuit, etc.). Image data detected by sensor 210 may be provided to processor 205, including image data detected for estimating depth based on DFD, such as preview images.

Processor 205 may be implemented using one of an integrated circuit microprocessor, microcontroller, digital signal processor and processor in general. Processor 205 may be configured to process received image data based on, for example, specific image processing algorithms stored in memory 215 in the form of processor-executable instructions. Processor 205 may further be configured to control exposure parameters, such as exposure periods, focus depth, etc. In certain embodiments, processor 205 may be configured to control one or more components of imaging device 200 including image sensor 210 to control AF. For example, processor 205 may be configured to adjust the focus depth of a lens base on an estimated depth determined using DFD.

Processed image data may be stored in memory 215 and/or provided to display 220 for viewing. It should be appreciated that memory 215 may relate to any combination of different memory storage devices, such as a hard drive, random access memory (RAM), read only memory (ROM), flash memory, or any other type of volatile and/or nonvolatile memory. It should further be appreciated that memory 215 may be implemented as multiple or discrete memories for storing processed image data, as well as the processor-executable instructions for processing the captured image data. Further, memory 215 may include removable memory, such as flash memory, for storage of image data.

Display 220 may relate to a liquid crystal display (LCD) incorporated into digital camera 200 for display of captured image data. Alternatively, it should be appreciated that an external display device may be coupled to digital camera 200 for display. Although FIG. 2 has been described above with respect to a digital camera, it should be appreciated that the device may relate to other devices, such as imaging devices in general. Further, it should also be appreciated that the device of FIG. 2 may relate to, or be included in, other devices, such as a mobile communication device and portable communication devices in general.

Figure 3:
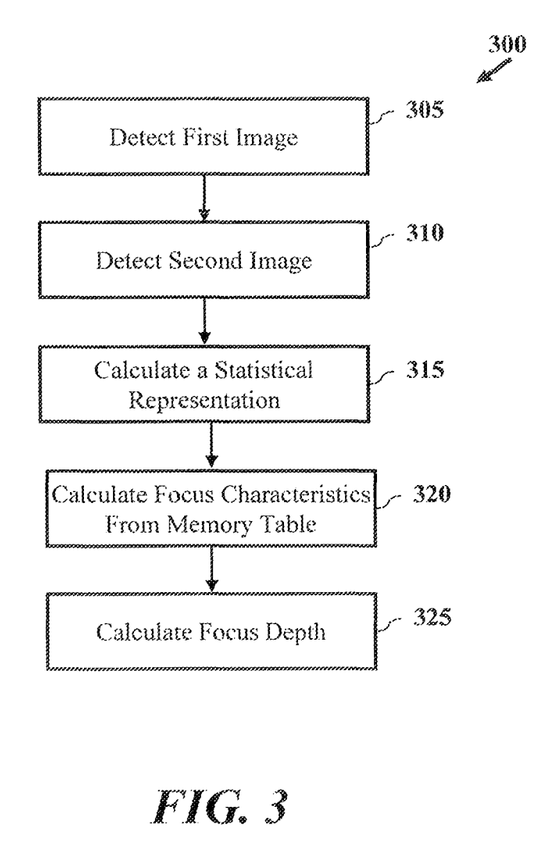
FIG. 3 depicts a process for depth estimation by a digital imaging device according to one or more embodiments of the invention.

Referring now to FIG. 3 a process is depicted for depth estimation by a digital imaging device according to one or more embodiments of the invention. Process 300 may be performed by one or more elements of the device of FIG. 2 (e.g., digital camera 200). According to another embodiment, process 300 may employed for automatic focus of an imaging device.

Process 300 is depicted for determining a focus depth for a scene by an imaging device. Process 300 may be initiated by detecting a first image of a scene at block 305 and detecting a second image of the scene at block 310. According to one embodiment, the image data detected at blocks 305 and 310 may be detected based on different focus parameters.

In one embodiment, image data of the first and second images may be aligned. Image alignment may be applied to one of the images. In one embodiment, image alignment may be based on a transformation between image data of the scene. For example, a transform may be determined for a first image $I_1(x,y)$ and $I_2(x,y)$ wherein the transform may be characterized as:

$$I_1(x,y) \approx I_2(f_x(x,y), f_y(x,y))$$

Accordingly, a transformation of image data for the first image may be characterized as $$I_1(x,y) \approx I_2(x-t_x, y-t_y)$$

It should also be appreciated that other methods may be employed for image alignment (e.g., image registration). By way of example, process 300 may include determining motion vectors between blocks, or feature points, of the two images for calculation of a global transformation. Similarly, it may also be appreciated that a RANSAC method may be employed for image alignment in certain embodiments. Based on the global transformation employed, the transformation may be applied to one of the images for correction based on one or more interpolation schemes (e.g., bilinear, bicubic, etc.). Process 300 may include application of an alignment transformation to regions of image data as will be further discussed in more detail with reference to FIG. 7 below.

Process 300 may then continue by calculating a statistical representation for one or more regions of interest in the image data, (e.g., statistics extraction) at block 315. In one embodiment, statistical representation may be calculated for each region of interest. A statistical representation may relate to statistical analysis of one or more regions of the image data. By way of example, statistical representation of an image region $f(x,y)$ may relate to:

$$S = \text{RankFilter}[|(f*h)(x,y)|, L],$$

where $h(x,y)$ is a filter (e.g. $h=[-1\ 1]$), $*$ denotes the convolution operation, and $\text{RankFilter}[f(x,y),L]$ represents ordering the values of $f(x,y)$ in a decreasing order and taking the Lth value.

According to another example, statistical representation of an image region may be determined by:

$$S = \Sigma_{x,y} |(f*h)(x,y)|^2)$$

wherein the values of a filtered image may be summed.

Calculating a statistical representation at block 315 may further include calculating generalized ratios for statistics which belong to the same region of interest. For example, a generalized ratio of two statistics S1, S2 may be characterized as: $R=\text{tg}-1(S1/S2)$. In another embodiment, the generalized ratio may be characterized as: $R=S1/S2$.

Process 300 may then determine parameters based on a memory table, such as look-up-table (LUT), at block 320. In one embodiment, determining parameters may include retrieving LUT values which correspond to different focus parameters. In one embodiment, generalized ratios may be employed for LUT input, wherein the LUT output may be employed to determine one or more depths for each region of interest. Based on values of the LUT and statistical representation, a focus depth may be calculated for automatic focus of an imaging device for a scene at block 325.

In certain embodiments, as will be described in more detail with respect to FIG. 10, more than a single depth may be estimated for a region of interest. Further, process 300 may include determining a confidence level for each estimated depth. For example, depth estimates provided at block 325 may be associated with output of an additional confidence LUT. The confidence LUT may be created during a calibration procedure. In one embodiment, confidence levels may be calculated based on the LUT values for depth.

In certain embodiments, process 300 may further provide a validity indication to determine whether the calculated statistics are above image noise. If the calculated statistics in one of the images (in some specified region of interests) is below the noise level then, this region of interest may be declared as non-valid. The validity indication may be test-image content dependent, and further may be an optional output of process 300. According to another embodiment, the DFD depth estimation process as described above in FIG. 3 may be based on a predetermined LUT for a scene. Similarly, calibration of the DFD may be determined for all possible and/or required pairs of focus positions. According to another embodiment, it should be appreciated that depth estimation as calculated in FIG. 3 may be applied to still and video imaging devices.

Figure 4:
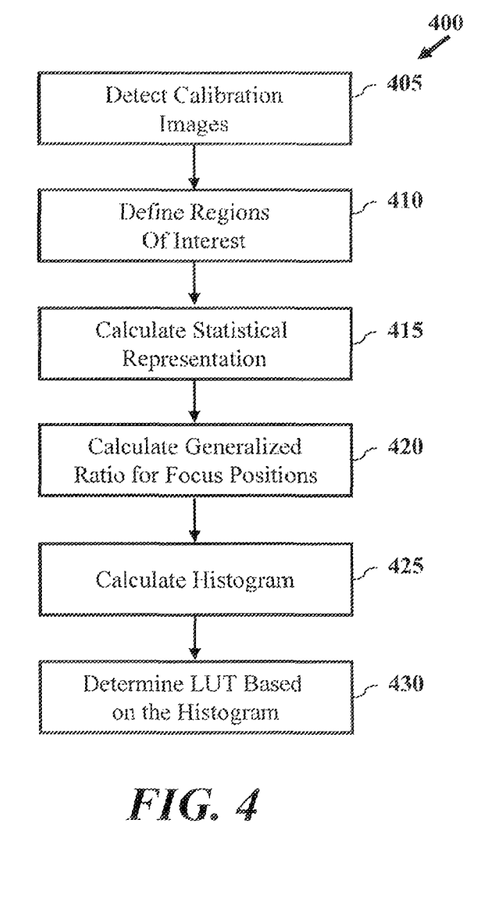
FIG. 4 depicts a process for calibrating a look-up-table (LUT) employed for depth estimation according to one embodiment of the invention.

Referring now to FIG. 4, a process is depicted for calibration of a LUT of an imaging device according to one embodiment. Process 400 may be initiated by acquiring calibration images at block 405. For example, in one embodiment an array of calibration chart images (e.g., V×U) may be acquired for V camera focus positions and U distances in the calibration chart. Each of the V camera positions and U distances may be employed to effectively span the focus range of an imaging device for a particular working point (e.g., zoom position). Calibration images may be denoted as (v,u), wherein $1 \le v \le V$, and $1 \le u \le U$.

At block 410, regions of interest in the images may be defined. For example, as will be discussed in more detail below with respect to FIGS. 8A-8B, one or more regions of the image window may be defined. A statistical representation for each region of interest may be calculated at block 415. The statistics may be denoted as $S(v,u,i)$ where v and u represent focus positions and distance, respectively, and i represents the region of interest. At block 420, process 400 may continue by calculating a generalized ratio of corresponding statistics for the images taken from the same region of interest. For example, the generalized ratio may be characterized as $R(v1,v2,u,i)=\text{tg}-1(S(v1,u,i)/S(v2,u,i))$.

At block 425, a histogram may be calculated for each pair of focus positions (v1, v2) and for each distance u. In one embodiment the histogram may be created using all ratio functions calculated for all regions of interest. The histogram may be provided to describe the generalized ratio probability distribution for a specific focus position (e.g., v1, v2) and distance (e.g., u). As will be discussed in more detail below with respect to FIG. 9, histograms may be calculated for a plurality of distances. Calculation of the histogram at block 425 may further include determining one or more histogram characteristics, such as the major mode of the histogram, and mean or median of the histogram.

Process 400 may further include determining LUT values based on a determined histogram at block 430. The major mode may be denoted by $R^0(v1,v2,u)$. According to one embodiment of the invention, for employed pair (v1, v2), the major mode may be employed for determining object distance relative to the generalized ratio. For example, the following represents the relation according to one embodiment:

$$r=R^0(v1,v2,u)$$

wherein the function can be interpolated, either linearly or otherwise, for values of u which are not measured. The inverse function may define the LUT which represents distance as a function of the generalized ratio which may be used for estimating focus distance. A graphical representation of an exemplary LUT values is depicted in FIG. 10.

In certain instances, the generalized ratio r may not provide monotonic values for u, rather there may be distances which correspond to a specific ratio value. In such a case, the LUT will provide the plurality of distance values. Further, different LUT's may be estimated for different focus, aperture, and/or zoom positions.

Figure 5:
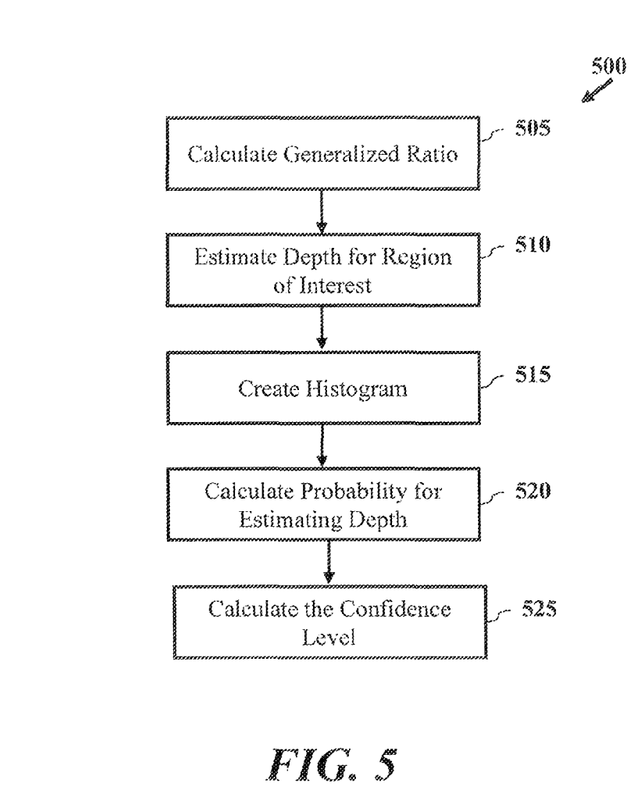
FIG. 5 depicts a process for calculating one or more confidence values associated with determining depth estimation according to one embodiment of the invention.

According to another embodiment of the invention, a confidence LUT may be determined. For example, the calibration LUT may be trained as part of a DFD calibration process (e.g., process 400). Referring now to FIG. 5, a process is depicted for calculating one or more confidence values associated with depth estimation. Process 500 may determine the probability for estimating a given depth, u_est for given focus positions (v1, v2). Process 500 may be initiated by calculating a generalized ratio for focus positions (e.g., (v1, v2)) at block 505. Calculations at block 505 may be based on data determined by a calibration process, such as one or more of blocks 405-420 of FIG. 4. It may also be appreciated that the generalized ratio for focus positions may be determined based on a differing set of chart images than previously determined for LUT calibration.

At block 510, generalized ratios, R(v1,v2,u,i), may be used for a given focus position (v1,v2) and given depth u, to estimate the depth for each region of interest, u_est(v1,v2,u,i). Depth may be calculated based on values determined by the LUT as discussed above with reference to FIG. 3. At block 515, a histogram may be calculated based on all estimated depths for each region of interest.

Based on the calculated histogram, the respective probability function for estimating depth, P(u_est(v1,v2,u) may be calculated at block 520. By selecting a subset $Uc \subset U$, wherein the probability for estimating u_est from Uc can be formulated as:

$$P\_Uc(u\_est|v1,v2) = \Sigma_{u \in Uc} P(u\_est|v1,v2,u) \cdot P(u|v1,v2)$$

For example, assuming P(u|v1,v2) is uniformly distributed in a predefined region, P_Uc(u_est|v1,v2) and P_Uc(u_est|v1,v2, u) may be calculated.

At block 525, the confidence level for each u_est∈U may be calculated and stored in a confidence LUT. By defining Uc as a subset of U that includes only values that are close to u_est, thus representing the probability for a correct estimation, the confidence level can be devised from the formulation:

$$Confidence(u\_est|v1,v2) = P\_Uc(u\_est|v1,v2)/P\_U(u\_est|v1,v2)$$

where P_U(u_est|v1,v2) is the probability to obtain u_est when using all the elements from U.

According to another embodiment, a confidence level calculated for the depth LUT may be based on a derivative of distance u of the function $r=R^0(v1,v2, u)$, calculated during the calibration procedure. Accordingly, the confidence level may be denoted as:

$$Conf(u) = \left| \frac{\partial R^0(v1, v2, u)}{\partial u} \right|$$

In this fashion, the function may provide values representative of zero to infinity, wherein the higher the value, the higher the confidence that the resulted depth estimation is correct. In certain embodiments, the confidence level function may be limited, or truncated, and can be implemented using a confidence LUT. In one embodiment, confidence levels calculated for the depth LUT may be employed to select one or more values for setting AF of the imaging device.

Figure 6:
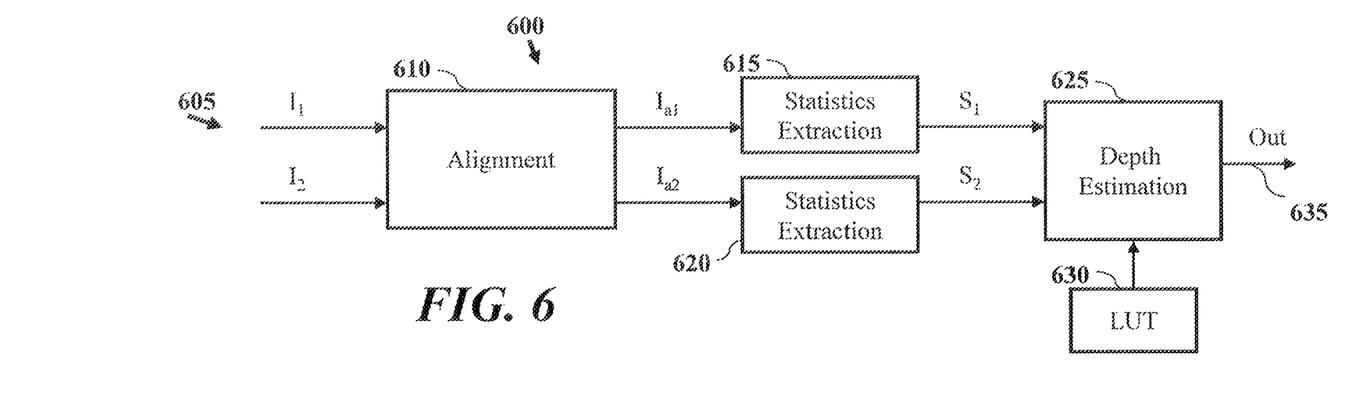
FIG. 6 depicts a graphical representation of a DFD process for depth estimation according to one embodiment of the invention.

Referring now to FIG. 6, a graphical representation of a DFD process is depicted according to one embodiment of the invention. DFD process 600 may be performed by an imaging device to provide auto focus. As depicted in FIG. 6, a DFD process may be initiated by receiving image data, shown as 605. In one embodiment, DFD process 600 may be performed for two images, however it may be appreciated that additional images may be previewed by an imaging device (e.g., imaging device 200). Image data 605 may relate to two images of a scene captured with different focus parameters, such as preview images associated with the first and second images. In certain embodiments, image data 605 may be down sampled since an image, $I_1$ for example, may be blurred (due to out of focus) version of $I_2$. Accordingly, image data 605 may thus be down sampled prior to alignment.

As depicted in FIG. 6, image data 605 may be aligned at block 610 so that image data of the frames may be compared. Based on the alignment, a statistical representation at blocks 615 and 620 may be calculated for aligned image data, that is one or more of aligned image $I_{a1}$ and $I_{a2}$, for each region of interest in an image. Statistical representations, $S_1$ and $S_2$, generated at blocks 615 and 620 for each image may then be employed for depth estimation at block 625 based on one or more values of LUT 630. LUT 630 may store information associated with the focus parameters of the preview images $I_1$ and $I_2$. Estimated depth determined by the imaging device may then be output for automatic focus of the imaging device for a scene associated with the preview images $I_1$ and $I_2$ as shown by 635.

Figure 7:
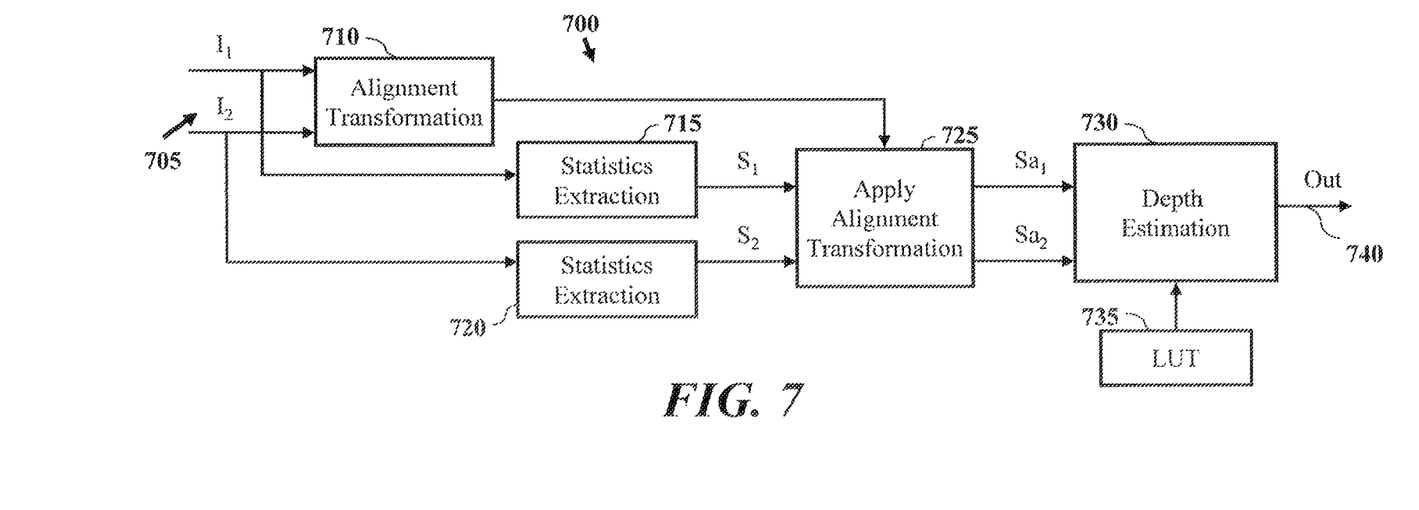
FIG. 7 depicts a graphical representation of a DFD process for depth estimation according to another embodiment of the invention.

According to another embodiment, an alignment transformation may be determined for image data and applied to statistics. Referring now to FIG. 7 a graphical representation of a DFD process is depicted according to another embodiment of the invention. DFD process 700 may be performed by an imaging device to provide automatic focus in a similar fashion to the DFD process of FIG. 6. As depicted in FIG. 7, DFD process may be initiated by receiving image data, shown as 705. DFD process 700 may be performed for two images, however it may be appreciated that additional images may be previewed by an imaging device (e.g., imaging device 200). As depicted in FIG. 7, an alignment transformation, shown as 710, may be performed for image data 705. In addition, process 700 may determine statistics for each of nonaligned images $I_1$ and $I_2$ as shown by statistics extraction 715 and 720. The determined alignment transformation 710 may then be applied to the statistical representations $S_1$ and $S_2$ associated with images $I_1$ and $I_2$, respectively, as shown by 725. The alignment may be performed directly on the statistics, not the entire images. Accordingly, depth estimation may be determined for statistical representations, $S_{a1}$ and $S_{a2}$ as shown by 730, based on LUT 735 information associated with the focus parameters of the preview images $I_1$ and $I_2$. The estimated depth determined by the imaging device may then be output for automatic focus of the imaging device as shown by 740.

Figure 8A:
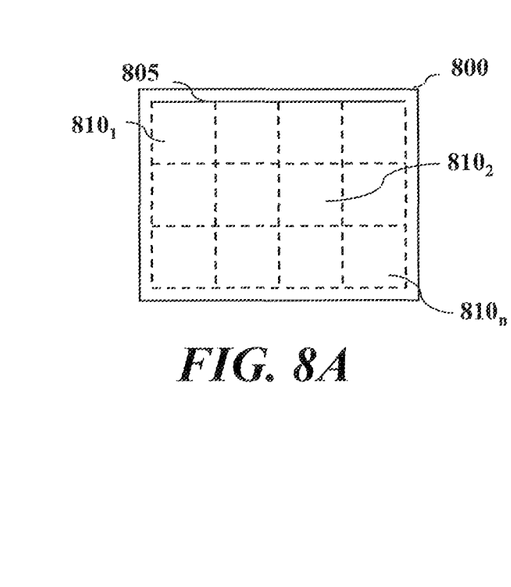
FIGS. 8A-8B depict graphical representations of regions for statistical analysis by a DFD process according to one embodiment of the invention.
Figure 8B:
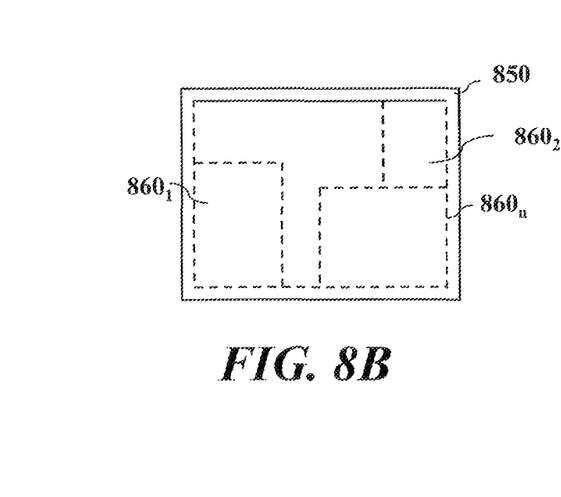

Referring now to FIGS. 8A-8B, a graphical representation is depicted for regions of statistics extraction by a DFD process according to one or more embodiments. Referring first to FIG. 8A, statistics extraction may be performed on image data (e.g., image data 605 or 705) for one or more sub-windows. FIG. 8A depicts a frame 800 divided into sub-windows 805. According to one embodiment, division of image data into sub-windows may allow for unique DFD statistics per sub-windows. In certain embodiments, each sub-window may be analyzed for statistics extraction. In other embodiments only a portion of the sub-windows, such as sub-windows $810_{1-n}$, are utilized for calculation of statistics extraction.

Referring now to FIG. 8B, sub-windows for statistics extraction are depicted according to another embodiment. As depicted in FIG. 8B, sub-windows may be determined based on objects of an image scene and accordingly may not be uniform. Accordingly one or more sub-windows shown as $860_{1-n}$ may be analyzed for statistics extraction.

According to one embodiment, the same sub-windows may be employed for each image received. Further, selected windows may be employed for performing image alignment based on similarities between image content associated with a sub-window.

Figure 9:
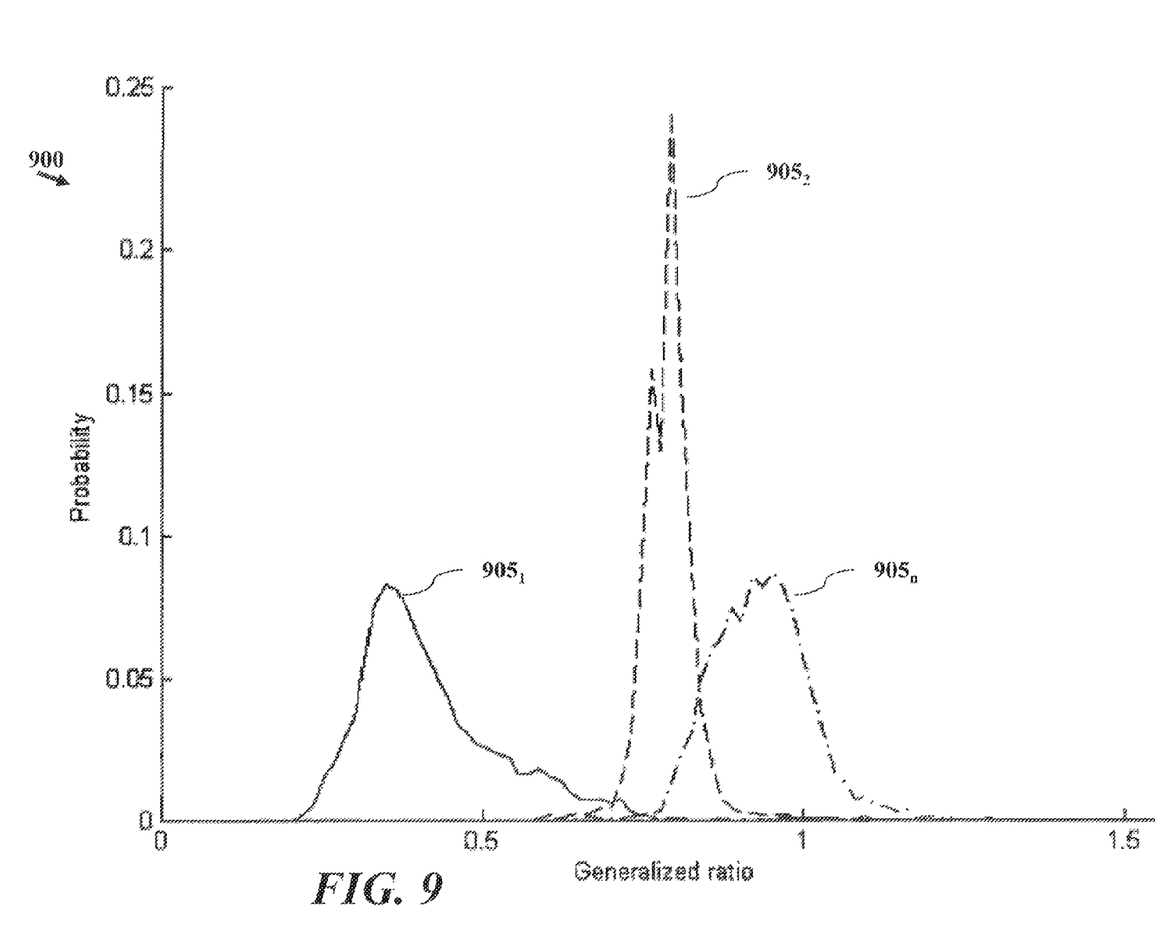
FIG. 9 depicts a graphical representation of a histogram which may be employed for estimation of a focus depth according to one embodiment of the invention.

Referring now to FIG. 9, a graphical representation is depicted of a probability function which may be employed for estimation of a focus depth according to one embodiment of the invention. A probability function may be generated for different distances (u) of objects in an image frame for DFD calibration. Respective probability function 900 is depicted for one or more depths u, shown as $905_{1-n}$.

Figure 10:
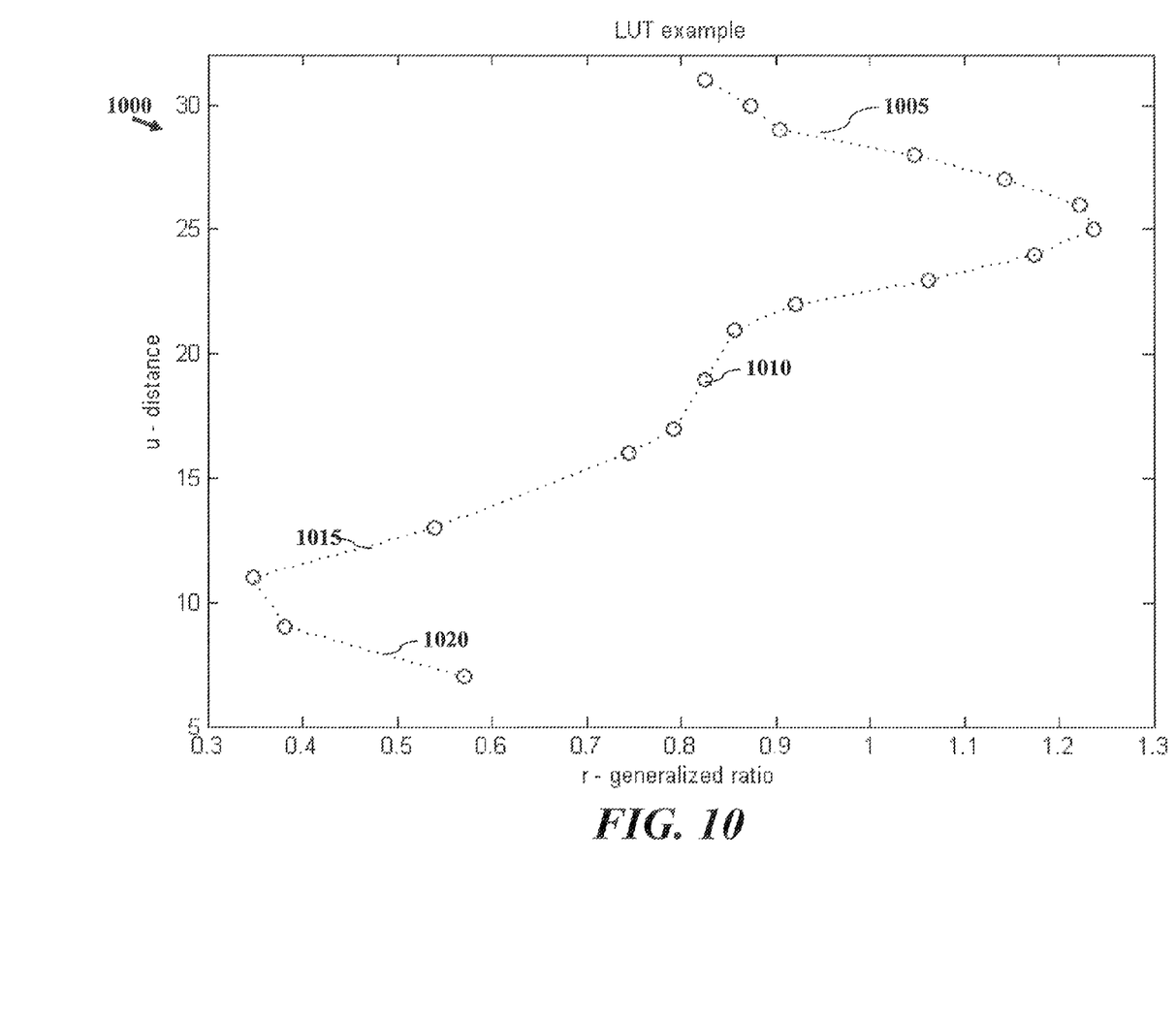
FIG. 10 depicts a graphical representation of a LUT which may be employed for estimation of a focus depth according to one embodiment of the invention.

Referring now to FIG. 10, a graphical representation is depicted of a LUT which may be employed for estimation of a focus depth according to one embodiment of the invention. LUT 1000 is depicted for distances (u) which correspond to generalize ratio (r). As discussed above the generalized ratio may calculated represent the connection between objects distance as a function of the generalized ratio. As further discussed above, there may be several instances where the mode of the histogram, corresponds to several distances which correspond to a specific ratio value. Measurement values for distances are shown by nodes 1010. As depicted in FIG. 10, the major mode of a histogram, shown as 1005, includes several distances which correspond to a particular ratio value. For example, distances 1015 and 1020 correspond to a generalized ratio of 0.5. According to one embodiment, the LUT may output each distance, such as distances 1015 and 1020 for determining depth estimation.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for calculating depth estimation for a digital imaging device, the method comprising the acts of:

detecting a first image, by the digital imaging device, associated with a first focus parameter;
  detecting a second image, by the digital imaging device, associated with a second focus parameter;
  calculating a statistical representation of a region of interest in the first and second images, wherein the statistical representation is based at least on convoluting at least one filter with the image data for the first and second images;
  determining a ratio for the region of interest based on the statistical representation;
  determining one or more focus characteristics using a memory table based on the determined ratio for the region of interest; and
  calculating a focus depth, by the digital imaging device, for capture of image data based on the determined one or more focus characteristics associated with the memory table.

2. The method of claim 1, wherein the first and second images are associated with different focus positions and are detected to determine one or more automatic focus parameters for the imaging device.

3. The method of claim 1, wherein the statistical representation for the region of interest indicates a relation between object depth and a blur ratio for the regions of interest.

4. The method of claim 1, wherein the ratio relates to one or more of a blur ratio and a generalized ratio for a region of interest.

5. The method of claim 1, wherein the memory table relates to a predetermined look-up-table (LUT) for a plurality of focus positions in a scene.

6. The method of claim 1, wherein focus depth relates to a depth estimation providing a focus depth for focusing the imaging device to capture a scene, and wherein the memory table represents object distance as a function of the ratio.

7. The method of claim 1, wherein a plurality of focus depths are determined for capturing image data for the scene.

8. The method of claim 7, further comprising determining a confidence level for each focus depth, and selecting a focus depth for automatic focus of the imaging device.

9. The method of claim 8, further comprising calculating calibration values for a confidence table based on the confidence levels and an estimated depth probability distribution for the confidence levels.

10. The method of claim 1, further comprising calculating calibration values for the memory table based on the focus parameters and a generalized ratio probability distribution for the focus parameters.

11. The method of claim 1, further comprising determining an alignment parameter for the first image relative to the second image, wherein the alignment parameter relates to an alignment transformation applied to image data associated with the region of interest.

12. The method of claim 1, further comprising adjusting an image sensor based on the calculated focus depth for capture of image data.

13. A device configured to estimate focus depth for a scene, the device comprising:

an image sensor configured to capture image data of the scene; and
  a processor coupled to the image sensor, the processor configured to receive a first image from the image sensor associated with a first focus parameter;
  receive a second image the image sensor associated with a second focus parameter;
  calculate a statistical representation of a region of interest in the first and second images, wherein the statistical representation is based at least on convoluting at least one filter with the image data for the first and second images;

determine a ratio for the region of interest based on the statistical representation;

determine one or more focus characteristics using a memory table based on the determined ratio for the region of interest; and calculate a focus depth for capture of image data based on the determined one or more focus characteristics associated with the memory table.

14. The device of claim 13, wherein the first and second images are associated with different focus positions and are detected to determine one or more automatic focus parameters for the imaging device.

15. The device of claim 13, Wherein the statistical representation for the region of interest indicates a relation between object depth and a blur ratio for the regions of interest.

16. The device of claim 13, wherein the ratio relates to one or more of a blur ratio and a generalized ratio for a region of interest.

17. The device of claim 13, wherein the memory table relates to a predetermined look-up-table (LUT) for a plurality of focus positions in a scene.

18. The device of claim 13, wherein focus depth relates to a depth estimation providing a focus depth for focusing the imaging device to capture a scene, and wherein the memory table represents object distance as a function of the ratio.

19. The device of claim 13, wherein a plurality of focus depths are determined for capturing image data for the scene.

20. The device of claim 19, wherein the processor is configured to determine a confidence level for each focus depth, and select a focus depth for automatic focus of the imaging device.

21. The device of claim 20, wherein the processor is configured to calculate calibration values for a confidence table based on the confidence levels and an estimated depth probability distribution for the confidence levels.

22. The device of claim 13, wherein the processor is configured to calculate calibration values for the memory table based on the focus parameters and a generalized ratio probability distribution for the focus parameters.

23. The device of claim 13, wherein the processor is further configured to determine an alignment parameter for the first image relative to the second image, wherein the alignment parameter relates to an alignment transformation applied to image data associated with the region of interest.

24. The device of claim 13, wherein the processor is configured to adjust the image sensor based on the calculated focus depth for capture of image data.

* * * * *

UNITED STATES PATENT AND TRADEMARK OFFICE
CERTIFICATE OF CORRECTION

PATENT NO. : 8,542,313 B2
APPLICATION NO. : 12/857343
DATED : September 24, 2013
INVENTOR(S) : Guy Rapaport et al.

It is certified that error appears in the above-identified patent and that said Letters Patent is hereby corrected as shown below:

In the Specification

In Column 7, Line 50, delete "P(u_est(v1,v2,u)" and insert -- P(u_est|v1,v2,u) --, therefor.

In the Claims

In Column 11, Line 15, in Claim 15, delete "Wherein" and insert -- wherein --, therefor.

Signed and Sealed this
Twentieth Day of May, 2014

Michelle K. Lee
*Deputy Director of the United States Patent and Trademark Office*